United States Patent
Lamesch et al.

(10) Patent No.: US 12,480,983 B2
(45) Date of Patent: Nov. 25, 2025

(54) LOW-COST, HIGH MEASUREMENT SPEED CAPACITIVE SENSING CIRCUIT FOR LOADING MODE OPERATION OF CAPACITIVE SENSORS

(71) Applicant: IEE INTERNATIONAL ELECTRONICS & ENGINEERING S.A., Echternach (LU)

(72) Inventors: Laurent Lamesch, Reichlange (LU); Tobias Justinger, Hermeskeil (DE); Michael Pütz, Trier (DE); Thomas Faber, Schweich (DE); Christoph Wendt, Trier (DE); Johnny Lorang, Schieren (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 275 days.

(21) Appl. No.: 18/037,011

(22) PCT Filed: Nov. 15, 2021

(86) PCT No.: PCT/EP2021/081740
§ 371 (c)(1),
(2) Date: May 15, 2023

(87) PCT Pub. No.: WO2022/101485
PCT Pub. Date: May 19, 2022

(65) Prior Publication Data
US 2024/0003947 A1    Jan. 4, 2024

(30) Foreign Application Priority Data

Nov. 16, 2020 (LU) .................................. LU102242
Apr. 12, 2021 (LU) .................................. LU500032

(51) Int. Cl.
*G01R 27/02* (2006.01)
*B60N 2/00* (2006.01)
(Continued)

(52) U.S. Cl.
CPC ........... *G01R 27/02* (2013.01); *B60N 2/0021* (2023.08); *H03K 17/62* (2013.01); *H03K 17/955* (2013.01);
(Continued)

(58) Field of Classification Search
CPC .. G01R 27/02; B60N 2/0021; B60N 2210/12; H03K 17/955; H03K 2217/960735; H03K 2217/960745; H03K 17/62
See application file for complete search history.

(56) References Cited

U.S. PATENT DOCUMENTS 6,392,542 B1   5/2002   Stanley
8,354,936 B2   1/2013   Ootaka
(Continued)

FOREIGN PATENT DOCUMENTS

EP   2036780 A1   3/2009
EP   2400259 A1   12/2011
(Continued)

OTHER PUBLICATIONS

J. R. Smith et al., Electric Field Sensing for Graphical Interfaces, IEEE Comput. Graph. Appl., 18(3):54-60, 1998.
(Continued)

*Primary Examiner* — Amy He
(74) *Attorney, Agent, or Firm* — Reising Ethington P.C.

(57) ABSTRACT

An impedance measurement circuit for determining a complex impedance of a capacitive sensor having at least one sense electrode operable in loading mode and at least one guard electrode. The measurement circuit includes: a pulse generator unit for providing a periodic electric measurement
(Continued)

signal and a periodic electric guard signal; a signal sensing circuit for sensing a sense current flowing through the at least one sense electrode or the sense electrodes in response to the pulse generator unit measurement signal; and a control and evaluation unit. The control and evaluation unit is configured for determining a complex impedance from the determined sense currents with reference to a complex reference potential.

12 Claims, 5 Drawing Sheets

(51) Int. Cl.
 *H03K 17/62* (2006.01)
 *H03K 17/955* (2006.01)
(52) U.S. Cl.
 CPC .............. *B60N 2210/12* (2023.08); *H03K 2217/960735* (2013.01)

(56) References Cited

U.S. PATENT DOCUMENTS

| | | | |
|---|---|---|---|
| 2003/0065461 A1* | 4/2003 | Yoon | G01R 31/2839 702/76 |
| 2005/0253712 A1 | 11/2005 | Kimura et al. | |
| 2008/0093925 A1 | 4/2008 | Kobayashi | |
| 2012/0286800 A1 | 11/2012 | Maharyta | |
| 2017/0355337 A1* | 12/2017 | Lamesch | B60R 21/01532 |

FOREIGN PATENT DOCUMENTS

| | | |
|---|---|---|
| LU | 100986 B1 * | 5/2020 |
| WO | 2012043443 A1 | 4/2012 |
| WO | 2014166881 A1 | 10/2014 |
| WO | 2016062824 A1 | 4/2016 |
| WO | 2016071416 A1 | 5/2016 |
| WO | 2017129533 A1 | 8/2017 |
| WO | 2017129552 A1 | 8/2017 |

OTHER PUBLICATIONS

International Search Report for application No. PCT/EP2021/081740, dated Feb. 16, 2022, 3 pages.
Written Opinion for application No. PCT/EP2021/081740, Feb. 16, 2022, 5 pages.

* cited by examiner

LOW-COST, HIGH MEASUREMENT SPEED CAPACITIVE SENSING CIRCUIT FOR LOADING MODE OPERATION OF CAPACITIVE SENSORS

TECHNICAL FIELD

The invention relates to an impedance measurement circuit for determining a complex impedance of a capacitive sensor having at least one sense electrode operable in loading mode and at least one guard electrode, and a capacitive sensing device, particularly for use in automotive applications, including such impedance measurement circuit.

BACKGROUND

Capacitive sensors and capacitive measurement and/or detection devices employing capacitive sensors have a wide range of applications, and are among others used for the detection of the presence and/or the position of a conductive body or body portion in the vicinity of an antenna electrode.

As used herein, the term "capacitive sensor" designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode—which may be identical with or different from emitting antenna electrodes—at which the influence of an object or living being on the electric field is detected.

In the field of automotive vehicle sensor applications, it is known to employ capacitive sensors for providing input to Automatic Driver Assistance Systems (ADAS), for instance for the purpose of a seat belt reminder (SBR) system or an activation control for an auxiliary restraint system (ARS). Sensed signals can serve as a basis for making decisions by an ADAS, for instance for a decision to deploy an air bag system to a specific vehicle seat or not.

Capacitive occupant sensing systems have been proposed in great variety, e.g. for controlling the deployment of one or more airbags, such as e.g. a driver airbag, a passenger airbag and/or a side airbag. Another example for the use of capacitive sensors in an automotive vehicle application is the so-called Hands off Detection (HoD) system, in which one or more sensors provide information about whether a driver has his hands on a steering wheel of a vehicle or not. This information can be transferred to an ADAS such as an Adaptive Cruise Control (ACC), which, based on the provided sensor signal, can alert the driver and remind him or her to take control of the steering wheel again. In particular, such HoD systems can be used in support to fulfill a requirement of the Vienna convention that the driver must remain in control of the vehicle at all times. HoD systems may as well be employed in a parking assistance system or an ADAS that is configured for evaluating a driver activity at high speed.

In some (so-called "loading mode") capacitive sensors, the at least one antenna electrode serve at the same time as sensing electrode. In this case, a measurement circuit determines a current flowing into the at least one antenna electrode in response to an oscillating voltage being applied to them. The relationship of voltage to current yields the complex impedance between the at least one antenna electrode and ground potential. In an alternative version of capacitive sensors ("coupling mode" capacitive sensors), the transmitting antenna electrode(s) and the sensing electrode(s) are separate from one another. In this case, the measurement circuit determines a current or voltage that is induced in the sensing electrode when at least one transmitting antenna electrode is being operated.

Different capacitive sensing mechanisms are for instance explained in the technical paper entitled "Electric Field Sensing for Graphical Interfaces" by J. R. Smith et al., published in IEEE Computer Graphics and Applications, 18(3): 54-60, 1998, which shall hereby be incorporated by reference in its entirety with effect for the jurisdictions permitting incorporation by reference.

The paper describes the concept of electric field sensing as used for making non-contact three-dimensional position measurements, and more particularly for sensing the position of a human hand for purposes of providing three dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", which is alternatively referred to as "coupling mode", an oscillating voltage signal is applied to the transmitting electrode, building up an electric field to a receiving electrode, and the displacement current induced at the receiving electrode is measured. The measured displacement current depends on the body being sensed. In the "transmit mode", the transmit electrode is put in contact with the user's body, which then becomes a transmitter relative to a receiver, either by direct electrical connection or via capacitive coupling.

The capacitive coupling strength may, for instance, be determined by applying an alternating voltage signal to an antenna electrode and by measuring the current flowing from that antenna electrode either towards ground (in the loading mode) or into a second antenna electrode (in the coupling mode). This current may be measured by a transimpedance amplifier, which is connected to the sensing electrode and which converts the current flowing into the sensing electrode into a voltage proportional to this current.

For instance, EP 2036780 A1 describes an operational amplifier-based capacitive loading mode measurement. An occupant detection system comprises an electrode arrangement for placement into a seat of an automotive vehicle and an evaluation circuit operatively connected to the electrode arrangement. The latter includes a first electrode, a second electrode and an electric insulator layer sandwiched between the first and second electrodes. When the electrode arrangement is in place in the seat, the first electrode forms with vehicle ground a first capacitor having a first capacitance, the first electrode forms with the second electrode a second capacitor having a second capacitance and the second electrode forms a first plate of a third capacitor having a third capacitance. As a first indicator of the seat occupancy state, a measure of the first capacitance is determined while the second electrode is operated as a driven shield for the first electrode. The fluctuations of at least one of the first, second and third capacitances are measured and the frequency spectrum of the measured fluctuations is analyzed, which yields a second indicator of the occupancy state. The derivation of the occupancy state of the seat is then based on both the first indicator and the second indicator.

The complex impedance measurement for determining an unknown impedance that is equivalent to an influence of an object or living being on the electric field of a sensing electrode of a capacitive sensor is often determined by a sampling measurement, for instance of a sense current, by employing one or more analog-to-digital converters (ADC). Solutions have been proposed in the prior art to lower the requirement regarding a sampling frequency of the ADC, which is an important factor for complexity and cost effectiveness.

For example, WO 2016/071416 A1 proposes a low-cost complex impedance measurement circuit. A method of measuring impedance of a sense-only capacitive sensor operated in loading mode comprises the following steps: combining a plurality of synchronized output signals; applying low-pass filtering to the summed output signals to generate a sinusoidal test signal; applying the sinusoidal test signal to a sensor signal voltage divider circuit and to a reference voltage divider circuit; determining amplitude and relative phase, with respect to the sinusoidal test signal, of a sensor voltage signal and a reference voltage signal; obtaining a difference voltage signal by subtracting the reference voltage signal from the sensor voltage signal; and feeding the difference voltage signal to a vector demodulator unit for obtaining a real part and an imaginary part of the complex impedance of the capacitive sensor. Both the sensor voltage signal and the reference voltage signal are individually sampled in an ADC converter and the resulting sampled values are subtracted in order to obtain the difference voltage signal. An equivalent-time sampling method is employed for measuring the sensor voltage signal and the reference voltage signal.

As in the previous example, some capacitive sensors are designed as sense-only capacitive sensors having a single sense electrode. Also, quite often capacitive sensors are used that comprise a sense electrode and a so-called "guard electrode" that are proximally arranged and mutually galvanically insulated from each other. This technique of "guarding" is well known in the art and is frequently used for intentionally masking, and thus shaping, a sensitivity regime of a capacitive sensor. To this end, the guard electrode is kept at the same electric AC potential as the sense electrode. As a result, a space between the sense electrode and the guard electrode is free of an electric field, and the guard-sense capacitive sensor is insensitive in a direction between the sense electrode and the guard electrode.

The equivalent-time sampling method is also used in a low-cost complex impedance measurement circuit for guard-sense capacitive sensors operated in loading mode described in WO 2016/062824 A1. A microcontroller uses a combination of several synchronized PWM outputs to generate a low distortion sine wave by summing the PWM outputs and filtering the summed signal. The sine wave is used as guard voltage for the guard electrode. The unknown impedance is measured by impinging the guard voltage on the sense electrode by a transistor connected in common base configuration and then transferring the sense current through the common base connected transistor to a transimpedance amplifier made out of a second transistor connected in common emitter configuration. The output voltage at the collector of the second transistor is measured by an ADC input of the microcontroller. The microcontroller translates the ADC output values into the unknown impedance to be measured by doing a software demodulation of the ADC output values. Additionally, in order to increase the precision of the measurement, a reference impedance can be connected in parallel to the unknown impedance and be used by the microcontroller to eliminate gain errors of the signal sensing circuit.

Capacitive sensing systems which are used in the control of airbag systems or other safety-related applications may be considered as safety-relevant system components. It may thus be necessary to monitor the good functioning of the different components of the sensor (sensing electrode and/or guard electrode) in order to rule out a false reading by the capacitive occupancy or proximity detection system.

Specifically in Hands off Detection (HoD) systems, a guard electrode is often employed for shielding one or more sense electrodes from inner parts of a vehicle steering wheel. Any damage of an electric connection of the guard electrode to a signal-processing circuitry of a capacitive sensor system can jeopardize the reliability of measurement results of the capacitive sensor.

It has been proposed in the prior art to furnish capacitive measurement circuits with sensor diagnostic means for detecting a capacitive sensor interruption, for instance a guard electrode interruption. One approach uses switching a reference input of a transimpedance amplifier from an AC reference source to AC ground, respectively to an attenuated AC reference.

A solution for such capacitive sensing system with sensor diagnostic is known from WO 2017/129552 A1. A capacitance measurement circuit for determining a sense current of a capacitive sensor with a sense electrode and a guard electrode comprises a periodic signal voltage source, a sense current measurement circuit configured for determining the sense current with reference to a reference voltage, at least one remotely controllable switch member, wherein in the first switching state, the at least one switch member electrically connects the sense current measurement circuit to the periodic measurement voltage for providing a first reference voltage, and in the second switching state, the at least one switch member electrically connects the sense current measurement circuit to a second reference voltage that is different from the first reference voltage.

Further, conceptually different approaches for sensor diagnostics are described in EP 2036780 A1 (described above), EP 2 400 259 A1, U.S. Pat. No. 8,354,936 B2, US 2005/0253712 A1, US 2008/0093925 A1 and WO 2012/043443 A1.

EP 2 400 259 A1 proposes an occupant attitude detection apparatus and an occupant attitude detection method. To be configured inexpensively to enable cost reduction and sense sitting posture of an occupant highly accurately, an occupant posture sensing apparatus includes a capacitance sensor unit and a circuit unit. The capacitance sensor unit includes first and second sensing electrodes provided at portions of a vehicle interior ceiling ahead of and right above a seat and connected to a capacitance sensing circuit of the circuit unit and a shield-driving circuit through selector switches SW1 and SW2. A CPU of the circuit unit determines a sitting posture of occupant (human body) sitting on the seat based on information regarding position of head of the occupant by using capacitance values detected by the capacitance sensing circuit based on capacitances from the sensing electrodes. Posture information regarding the determined sitting posture is output to ECU mounted on the vehicle and used for controlling air bag deployment, etc.

U.S. Pat. No. 8,354,936 B2 describes a capacitive passenger detector for a vehicle. The capacitive passenger detector includes: a capacitive sensor having main, sub and guard electrodes; a sensor characteristic measurement unit for applying an alternating voltage signal to each electrode and for converting a current in each electrode to a voltage; and a controller. The controller defines a current in the guard electrode as a reference current when voltages of the main and guard electrodes have a same potential. The controller defines a current flowing direction of the guard electrode to be negative when the voltage of the main electrode is higher than the guard electrode. The controller defines the current flowing direction of the guard electrode to be positive when the voltage of the main electrode is lower than the guard electrode. The controller corrects the voltage of the main electrode based on the current of the guard electrode so that a corrected voltage is set to be a passenger determination data.

From US 2005/0253712 A1, an occupant determination apparatus and an occupant determination method are known that can accurately determine the size of an occupant, with a simple configuration, wherein a plurality of electrodes are arranged on one layer, and can eliminate errors due to the capacitance between an occupant and surrounding car-body metal parts or the like, and thus suppress erroneous determination. The occupant determination apparatus comprises a first sensor including a plurality of seat section electrodes arranged on a sitting section, and a first determination section. The first sensor section comprises: a first seat section electrode; a reference electrode array, wherein second seat section electrodes are arranged separate in the X-direction; and a reference electrode array, wherein third seat section electrodes are arranged separate in the X-direction, arranged separate in the y-direction. The first determination section comprises: an oscillator; a capacitance detecting section, which detects the current flowing through a seat section electrode in order to detect the capacitance; a switching circuit, which switches the connection of the capacitance detecting section to the seat section electrode; and a controlling section, which outputs a switch control signal.

US 2008/0093925 A1 describes a passenger detection apparatus for detecting breakage on a shield line without being affected by peripheral shield cables. The passenger detection apparatus includes sensors arranged on a seat in a vehicle; shield cables corresponding to the sensors, wherein one end of the core wire is connected to the corresponding one of the sensors; a measurement signal output device for outputting a measurement AC signal; a device for detecting a current output from the measurement signal output device; a device for outputting a capacitance canceling AC signal, which has the same phase and the same level as those of the measurement AC signal; a device for selectively applying one of the measurement AC signal and a DC voltage to the other end of each shield cable; and a device for selectively applying one of the capacitance canceling AC signal and a second signal, which has a different waveform from that of the measurement AC signal, to the shield of each shield cable.

Furthermore, WO 2012/043443 A1 proposes a capacitance sensor and a method for determining failure of capacitance sensor by a detecting electrode, which detects capacitance; a shield electrode, which is disposed in the vicinity of the detecting electrode; a shield drive circuit, which applies to the shield electrode a first potential and a second potential, which is different from the first potential, by performing switching between the first potential and the second potential; a detecting circuit, which outputs a detection signal that corresponds to the capacitance detected by the detecting electrode; and a determining circuit, which determines absence/presence of an abnormality of the detecting electrode or that of the shield electrode on the basis of a first detection signal, which corresponds to the capacitance detected by the detecting electrode when the shield drive means applied the first potential to the shield electrode, and a second detection signal, which corresponds to the capacitance detected by the detecting electrode when the shield drive means applied the second potential to the shield electrode, the first detection signal and second detection signal being obtained from the detecting circuit.

Electronics circuit diagnostics by paralleling a reference impedance to the unknown impedance is, for example, described in WO 2014/166881 A1. A capacitive sensing device comprises an antenna electrode for emitting an alternating electric field in response to an alternating voltage caused in the antenna electrode, and a control and evaluation circuit configured to maintain the alternating voltage equal to an alternating reference voltage by injecting a current into the antenna electrode and to measure the current. The control and evaluation circuit includes a microcontroller with a digital output for providing a digital signal and a low-pass filter operatively connected to the digital output for generating the alternating reference voltage by low-pass-filtering the digital signal. The capacitive sensing device comprises at least one normative impedance controllably switchable in parallel to the antenna electrode with a switch arranged in series with the at least one normative impedance and controlled by the microcontroller.

Moreover, U.S. Pat. No. 6,392,542 B1 describes an occupant sensor with a guard electrode and reference switching. An electric field sensor comprises at least one electrode mountable within a seat is operatively coupled to a sensing circuit, which applies an oscillating signal, comprising at least one frequency or at least one pulse, to at least one electrode and generates a signal responsive to at least one electric field-influencing property of an object proximate to the electric field sensor. At least one frequency or pulse width of the applied signal are adapted to be at most weakly responsive to a wetting condition of the seat. A method of sensing an occupant comprises placing at least one electrode within a seat of a motor vehicle, applying an oscillating signal to at least one electrode, measuring the amplitude and phase of a signal responsive to the at least one electrode, rotating the measured amplitude and phase, compensating the rotated amplitude by a value responsive to the rotated phase, and comparing the compensated amplitude with a threshold.

Another factor that determines the complexity and cost effectiveness of a capacitive sensing system is the provision of the usual alternating measurement signal. A low-cost solution for sine wave generation employing a passive filter is described in WO 2016/071416 A1 presented before.

Another challenge for a cost-efficient capacitive detection device, particularly for use in automotive applications, is an as low as possible EMI susceptibility.

A solution is proposed in WO 2017/129533 A1 by a capacitive seat occupancy detection and classification system. The system includes an impedance measurement circuit and a control and evaluation unit. The impedance measurement circuit is configured for providing periodic electrical measurement signals to a capacitive sensor of N different fundamental frequencies, wherein N is a natural number of at least 3, and to determine a complex impedance from each of determined sense currents in the capacitive sensor. The control and evaluation unit is configured to determine a seat occupancy class for each one of the complex impedances determined at the at least N different fundamental frequencies, and to determine a final seat occupancy class derived by a majority decision among the determined seat occupancy classes. A high probability exists that only a fraction of the different fundamental frequencies are disturbed by resonances which might be present due to parasitic inductances and capacitances in an installed state of the capacitive seat occupancy detection and classification system.

Moreover, US 2012/0286800 A1 describes a capacitance sensing circuit, mainly for use in human interface devices such as touchpads, that may include a switching circuit configured to generate a sensor current by charging and discharging a capacitive sensor electrode, and a current mirror that generates a mirror current based on the sensor current. Based on the mirror current, a measurement circuit generates an output signal representative of a capacitance of the capacitive sensor electrode. The presence of the current mirror decreases the input impedance seen by the capacitive sensor. The decreased input impedance increases immunity of the measurement circuit to low frequency noise that is coupled to the system through the capacitive sensor or other conductors, such as PCB traces.

SUMMARY

It is therefore an object of the invention to provide a cost-efficient solution for a capacitive sensing device with a capacitive measurement circuit connectable to at least one capacitive sensor to be operated in loading mode, which may have one or more capacitive sense electrodes and at least one guard electrode, wherein the capacitive measurement circuit has improved properties regarding a speed of measurement, and may also be capable of providing at least one out of sensor diagnostics or electronic circuit diagnostics. At the same time, the capacitive measurement circuit should preferably achieve a high level of EMI robustness.

The capacitive sensing device should in particular be configured for use in automotive applications such as hands off detection (HoD) for vehicle steering wheels and vehicle seat occupancy detection.

In one aspect of the present invention, the object is achieved by an impedance measurement circuit for determining a complex impedance of a capacitive sensor having at least one sense electrode operable in loading mode and at least one guard electrode.

The proposed impedance measurement circuit comprises:
- a pulse generator unit for providing a periodic electric measurement signal that comprises a plurality of different fundamental measurement frequencies, and for providing a periodic electric guard signal;
- a signal sensing circuit including current measuring means for sensing a sense current flowing through the at least one sense electrode or the sense electrodes in response to the pulse generator unit measurement signal; and
- a control and evaluation unit that is at least configured for determining a complex impedance from the determined sense currents with reference to a complex reference potential.

The phrases "configured to" and "configured for", as used in this application, shall in particular be understood as being specifically programmed, laid out, furnished or arranged.

Preferably, the test signal frequency lies in a range between 10 kHz and 500 kHz. The pulse width modulation units have output signals of a fundamental frequency that may be selected within this frequency range. The term "fundamental frequency", as used in this application, shall particularly be understood as a lowest sinusoidal frequency in a Fourier analysis of the respective time-varying output signal.

By employing a plurality of different fundamental measurement frequencies, the proposed impedance measurement circuit can thus provide an improved speed of measurement of the complex impedance of the capacitive sensor and, by that, of the unknown impedance to be sensed.

The impedance measurement circuit can provide a cost-efficient solution of low hardware complexity.

In particular, the proposed impedance measurement circuit can be used in capacitive sensing devices in automotive applications such as hands off detection devices for vehicle steering wheels, and seat occupancy detection and/or classification devices for a vehicle seat or vehicle seats.

The term "automotive", as used in this patent application, shall particularly be understood as being suitable for use in vehicles including passenger cars, trucks, semi-trailer trucks and buses. The term "vehicle", as used in this application, shall particularly be understood to encompass passenger cars, trucks, semi-trailer trucks and buses.

Preferably, the impedance measurement circuit further comprises remotely controllable electric connection means for at least one out of selectively connecting one out of at least two provided reference potentials to a reference input port of the current measuring means, and selectively electrically operatively connecting at least one reference impedance of an a priori known impedance either in parallel to the at least one sense electrode or to the provided guard signal. The control and evaluation unit is further configured for controlling the remotely controllable electric connection means according to a predefined sequence, and for determining a complex impedance from the determined sense currents with reference to a complex reference potential during predefined stages of the predefined sequence.

By employing a plurality of different fundamental measurement frequencies, an appropriate embodiment of the remotely controllable electric connection means and an appropriate embodiment of the predefined sequence, the proposed impedance measurement circuit can thus provide a cost-efficient solution of low hardware complexity having an improved speed of measurement of the complex impedance of the capacitive sensor and, by that, of the unknown impedance to be sensed. At the same time, the proposed impedance measurement circuit can provide diagnostics of the sensor and/or diagnostics of the electronic circuit.

Preferably, the pulse generator unit is designed as a passive and amplitude-controlled generator unit that comprises a plurality of synchronized pulse width modulation units, wherein the pulse generator unit is configured to weight and to sum output signals of the plurality of synchronized pulse width modulation units having the plurality of different fundamental measurement frequencies, and a passive low-pass filter unit connected in series to the summed output signals. In this way, a solution with low hardware complexity can be achieved for providing a periodic measurement signal comprising a plurality of different fundamental measurement frequencies for a fast determining of a complex impedance of a capacitive sensor. A number of synchronized pulse width modulation units in the pulse generator unit can be selected depending on a respective existing requirement with regard to a distortion factor of the generated measurement signal.

Preferably, the pulse generator unit is configured for generating periodic electric measurement signals that are of sinusoidal shape.

Preferably, the pulse generator unit is configured to weight and to sum output signals of a plurality of synchronized pulse width modulation units having at least three superposed, simultaneously provided measurement signal frequencies. In this way, an especially high measurement speed and a high level of EMI robustness can be accomplished at the same time.

In preferred embodiments of the impedance measurement circuit, the pulse generator unit is designed to have a digital-to-analog converter operatively connected to a digital data memory unit, and the digital data memory unit is configured to provide data to the digital-to-analog converter that represent the periodic electric measurement signal. In this way, the electric measurement signal and the guard signal can be provided with a high level of flexibility and low hardware effort.

In preferred embodiments of the impedance measurement circuit, the pulse generator unit is further designed to provide a periodic reference signal to at least one reference impedance of an a priori known impedance, wherein a fundamental frequency of the periodic reference signal is different from any one of the plurality of fundamental measurement frequencies. A large improvement of the speed of measurement can be accomplished with such embodiments, as they enable to superpose signals for diagnostic or reference purposes and the signal from the measurement of the unknown impedance at the current measuring means for simultaneous signal processing and evaluation.

In preferred embodiments, the proposed impedance measurement circuit further comprises a remotely controllable variable attenuator circuit that is connected between the provided guard signal and at least another reference impedance having an a priori known impedance. The at least another reference impedance is electrically connected to the at least one sense electrode. This embodiment is especially useful for cases in which a large offset capacitance is present in parallel to the unknown impedance to be measured by allowing a variable bipolar offset susceptance to be added in parallel to the unknown impedance to be measured.

Preferably, the control and evaluation unit comprises a microcontroller that includes a processor unit, a digital data memory unit, a microcontroller system clock, and an analog-to-digital converter unit having at least one analog-to-digital converter for at least converting an output signal of the signal sensing circuit.

Microcontrollers that are equipped as described above are commercially available nowadays in many variations and at economic prices. In this way, an automated operation of the impedance measurement circuit can be enabled. Further, in an appropriate embodiment, an increased measurement speed can be accomplished with a low-cost microcontroller.

In embodiments of the impedance measurement circuit that comprise a digital-to-analog converter for generating the periodic electric measurement signal, the digital-to-analog converter may form an integral part of the microcontroller for fast and undisturbed signal transfer.

In preferred embodiments of the impedance measurement circuit, the microcontroller is configured to execute an equivalent-time sampling method. In this way, the impedance measurement can be carried out with sufficient precision and a high speed of measurement with low-cost hardware.

Preferably, the equivalent-time sampling method includes employing an incremental time delay between subsequent samples that is equal to one clock period of the microcontroller system clock.

The term "equivalent-time sampling method", as used in this application, shall particularly be understood as a sampling method in which only an instantaneous input signal is measured at the sampling instant and the input signal is only sampled once per trigger. In the subsequent sampling trigger, a small timely delay is added and another sample is taken. The intended number of samples determines the resulting number of cycles needed to reproduce the input signal.

In this way, requirements on hardware properties, particularly regarding speed of signal handling and processing, can be a lowered, which results in lower hardware costs and complexity of design.

In preferred embodiments of the impedance measurement circuit, the remotely controllable electric connection means comprise a plurality of electronic switches. In this way, the electric connection means can readily be controlled by output signals of the microcontroller, which usually exist within the microcontroller in a sufficient quantity. Preferably, the plurality of electronic switches comprises at least one metal-oxide-semiconductor field-effect transistor (MOSFET).

In preferred embodiments of the impedance measurement circuit, the control and evaluation unit is configured for applying a software demodulation method to a voltage signal that is representative of a sense current and is digitally converted by the analog-to-digital converter unit, for determining a real part and an imaginary part of the complex impedance of the capacitive sensor.

The use of a plurality of paralleled software demodulators for applying the software demodulation method can allow a simultaneous evaluation of the plurality of different fundamental measurement frequencies in the periodic electric measurement signal.

In this way, the complex impedances can be determined from the signals provided by the current measuring means with large measurement speed, a high level of flexibility and low hardware effort.

The same benefits can be accomplished in an alternative way if the control and evaluation unit is configured for applying a complex discrete Fourier transform (DFT) or a complex fast Fourier Transform (FFT) to a voltage signal that is representative of a sense current and that is digitally converted by the analog-to-digital converter unit.

In another aspect of the invention, a capacitive sensing device is provided. The capacitive sensing device comprises an embodiment of the impedance measurement circuit disclosed herein, and a capacitive sensor having at least one sense electrode operable in loading mode and at least one guard electrode.

The benefits described in context with the impedance measurement circuit apply to such capacitive sensing device to the full extent.

In another aspect of the invention, the use of the capacitive sensing device disclosed herein in a vehicle steering wheel for capacitive hands off detection is proposed.

In a further aspect of the invention, the use of the capacitive sensing device disclosed herein in a vehicle seat for seat occupancy detection and/or classification is proposed.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies different embodiments of the invention in particular in connection with the figures.

BRIEF DESCRIPTION OF THE DRAWINGS

Further details and advantages of the present invention will be apparent from the following detailed description of not limiting embodiments with reference to the attached drawing, wherein.

In order to avoid unnecessary repetitions, only differences with respect to the first embodiment will be described. For features that are not described in one of FIGS. 2 to 5 reference is made to the description of the first embodiment or one of the corresponding preceding embodiments.

In the different figures, the same parts are always provided with the same reference symbols or numerals, respectively. Thus, they are usually only described once.

DETAILED DESCRIPTION

FIGS. 1 to 5 each show a layout of a capacitive sensing device with a capacitive sensor having at least one sense electrode operable in loading mode and at least one guard electrode, and a possible embodiment of an impedance measurement circuit.

Each impedance measurement circuit comprises a pulse generator unit for providing a periodic electric measurement signal that comprises a plurality of different fundamental measurement frequencies, in particular of sinusoidal shape, a signal sensing circuit for sensing a sense current flowing through the capacitive sensor of the capacitive sensing device in response to the pulse generator unit measurement signal, remotely controllable electric connection means, and a control and an evaluation unit that is designed as a microcontroller. The microcontroller is configured for controlling the remotely controllable electric connection means and is further configured for determining a complex impedance from the determined sense currents with reference to a complex reference potential during predefined stages of the predefined sequence. Further details are given in the respective description for each one of the figures.

In the following description, the terms "sense node" and "guard node" are meant to specify connecting locations of the impedance measurement circuit to which a sense electrode and a guard electrode, respectively, of the capacitive sensor are connectable. Measuring the complex impedance of the capacitive sensor is equivalent to measuring the unknown complex impedance 1, 1' (or, briefly, unknown impedance) between sensor sense and ground potential.

Figure 1:
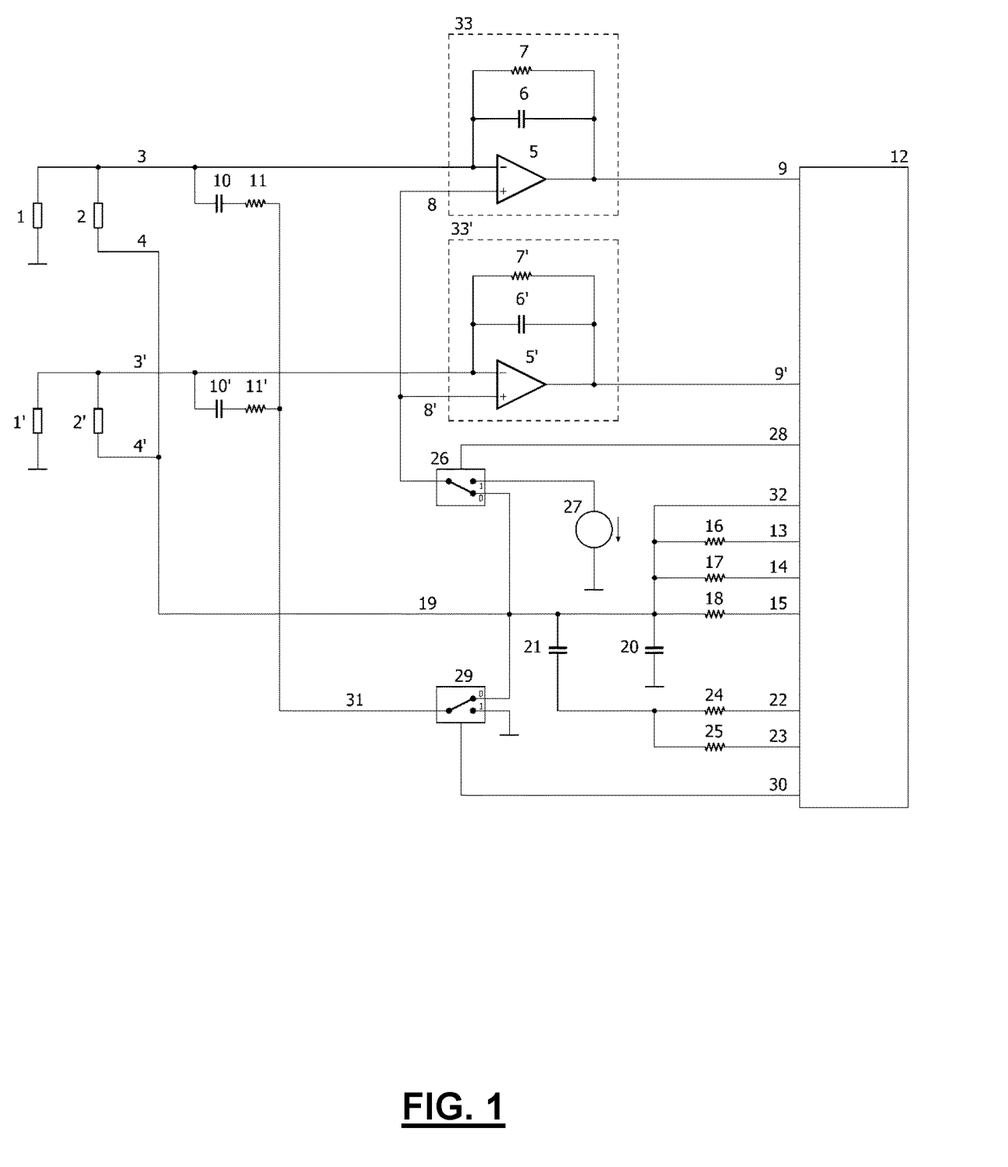
FIGS. 1 to 5 each show a layout of a capacitive sensing device with a possible embodiment of an impedance measurement circuit in accordance with the invention.

The circuit in FIG. 1 shows a two-channel implementation, but generally the number of channels can also be set to one or more than two. One sense electrode each of the capacitive sensor is connectable to the sense nodes 3, 3' of the respective channel, and a guard electrode that is common to both sense electrodes is connectable to the guard nodes 4, 4'. A respective sense-to-guard impedance is denoted by reference numerals 2, 2'.

A microcontroller 12 of the impedance measurement circuit includes a processor unit, a digital data memory unit, a microcontroller system clock and an analog-to-digital converter unit having a plurality of analog-to-digital converters. The pulse generator unit is designed as a passive, amplitude-controlled sine shaping pulse generator unit that forms part of the microcontroller 12.

The microcontroller 12 generates an approximated sine wave at guard node 19 by outputting appropriate PWM signals on its PWM outputs 13, 14, 15. FIG. 1 shows three PWM outputs, but the number can be increased or decreased depending on the needed accuracy of the sine wave approximation. The circuit in FIG. 1 is optimized for low-cost by using a passive low-pass filter unit connected in series to the summed output signals with only a single pole RC filter comprising resistors 16, 17, 18 and capacitor 20. As a low-cost capacitor 20 may have a large tolerance and temperature dependency (in particular if a large capacitance of the capacitor has to be used because the measurement frequency is set to a low value; for example an X7R type capacitor must be used if the measurement frequency is set below 50 kHz), the inaccuracy of the amplitude level of the signal at guard node 19 may lead to an insufficient measurement range of the measurement circuit, or to an insufficient measurement resolution. In order to avoid this issue, additional components 21, 24, 25 are added. By measuring the guard AC amplitude with ADC input 32 and comparing it to a set point, the microcontroller 12 selectively switches open drain output 22 and/or open drain output 23 to ground potential (or, briefly, ground), and thereby attenuating the guard amplitude by forming an AC voltage divider with the resistors 16, 17, 18 and selectively switched resistors 24, 25 to ground. Capacitor 21 avoids a shift of the DC bias voltage of the guard node 19. Two open drain outputs 22 and 23 and two resistors 24, 25 are shown, but the number can also be one or more than two.

Figure 3:
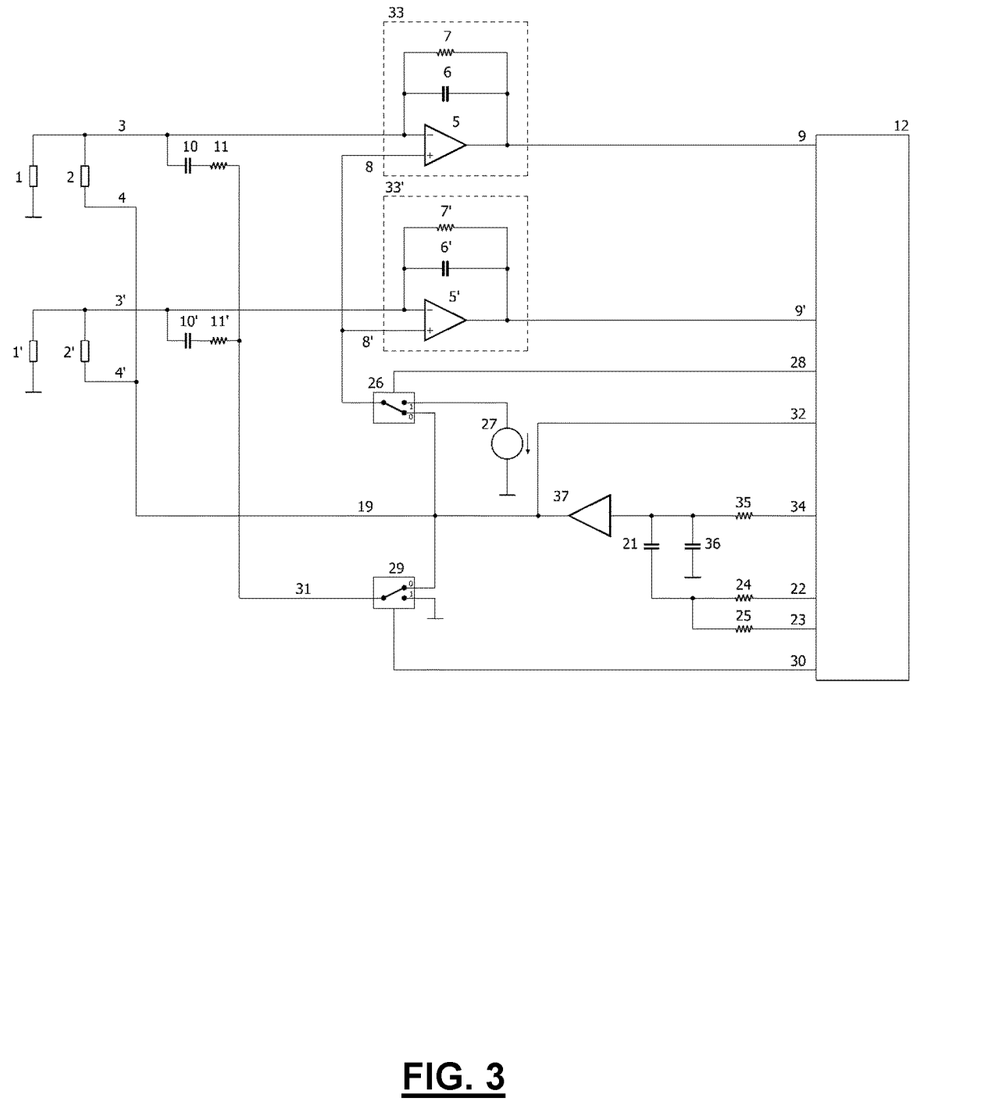

Another option to generate the guard node voltage is shown in FIG. 3. Here, an internal digital-to-analog converter (DAC) of microcontroller 12 is used. Numeral 34 denotes the DAC output. The DAC output is filtered by resistor 35 and capacitor 36. An optional amplifier 37 amplifies the resulting guard waveform. The sinewave at the DAC output can be generated by the microcontroller by for example periodically updating the DAC with values read from the internal memory which contains a sine function. Each value of the stored sine wave can be output one after the other to the DAC, or a DDS (digital direct synthesis) method can be employed, allowing an easy adjustment of the generated frequency. Another option to generate a sine wave is for example the application of the Coordinate Rotation Digital Computer (CORDIC) algorithm or low-pass or band-pass filtering a square wave. An advantage of the DAC is that the output amplitude can be scaled in software by scaling the input values to the DAC, making the external attenuator with resistors 24, 25 and capacitor 21 superfluous.

Referring again to FIG. 1, the guard voltage on guard node 19 is applied to the sensor guard nodes 4, 4'. Two transimpedance amplifiers 33, 33' are composed of operational amplifiers 5, 5' and feedback impedances 6, 6', 7, 7'. When measuring the unknown impedance 1, 1' between sensor sense and ground, remotely controllable electric connection means formed by a multiplexer 26 are switched to its lower position by microcontroller output 28, thereby connecting the guard node 19 to transimpedance amplifier reference inputs 8, 8'. The microcontroller 12 measures the output of transimpedance amplifiers 8, 8' with its ADC inputs 9, 9' simultaneously, and also simultaneously the guard voltage on ADC input 32 is measured. By measuring the transimpedance amplifier outputs simultaneously together with the guard node 19, the measurement time can be reduced (by measuring several channels in parallel), and the accuracy of the measurement can be improved by measuring the transimpedance outputs and guard node in parallel and thereby avoiding errors due to timing differences. Simultaneously means in this context that the different ADC inputs can either be sampled at substantially the same moment in time or scanned one after the other in a rotating fashion. For the rotating fashion, the small timing difference between channels must be accounted for later in the software demodulation in the microcontroller. ADC inputs 9 and 9' can also be sampled consecutively (that is, performing first a full measurement with the first channel, then proceed with the second) with increased measurement time without losing accuracy. Also, the guard voltage can be sampled consecutively compared to the transimpedance amplifier outputs, but then ADC sampling must be synchronized to the PWM outputs 13, 14, 15 in order to avoid measurement errors due to phase inconsistencies.

The microcontroller demodulates the sampled transimpedance amplifier output and guard signals using a software vector demodulator by multiplying the ADC samples with sine and cosine signals and integrating the results. If the resulting complex variables are then called $Dem_{TIA}$ for a transimpedance output and $Dem_{Guard}$ for the guard signal, then the following computation yields a complex value X which is indicative of the unknown impedance 1, 1' of the channel to be measured:

$$X = \frac{Dem_{TIA} - Dem_{Gaurd}}{Dem_{Gaurd}}$$

By switching remotely controllable electric connection means formed by another multiplexer 29 to its lower position by another digital output 30 of the microprocessor 12, reference impedances 10, 10', 11, 11' are connected in parallel to the unknown impedance 1, 1' to be measured. The improvement over cited prior art WO 2014/166881 A1 is the application of guarded reference switching. When the multiplexer 29 is in its upper position, the reference impedances 10, 10', 11, 11' are guarded, thereby eliminating the effects of parasitic impedances between node 31 and ground. As in WO 2014/166881 A1, the microcontroller can measure the value X defined above at first with guarded and then with grounded reference impedances, and by calculating the difference between the two values, extract a value which is indicative of the impedance of the reference impedances. This value can then be either used for diagnosing the circuit measuring the unknown impedance 1, 1', or it can be used as a reference to correct the value X above in order to eliminate measurement errors of the measurement circuit. As an option, additional switches 29 and reference impedances 10, 10', 11, 11' can be employed in order to perform diagnostics and also eliminate measurement errors.

The multiplexer 26 is used to measure the complex sense-to-guard impedances 2, 2' in order to diagnose the sensor and sensor wiring. When multiplexer 26 is set to its upper position with output signal 28, the reference inputs 8, 8' are connected to AC ground via DC voltage source 27. As the sense-to-guard impedances 2, 2' are typically significantly larger than the unknown sense-to-guard impedances 1, 1', and as the gain of the transimpedance amplifier should not be switchable for cost reasons, the amplitude of the guard signal is decreased in order to avoid a clipping of the transimpedance amplifier outputs or the ADC inputs 9, 9'. Microcontroller 12 selectively disables at least one of its PWM outputs by setting it or them to high impedance state, thereby attenuating the guard amplitude without introducing any additional cost. The sense-to-guard impedances 2, 2' are measured by the microcontroller 12 similarly to the unknown impedance 1, 1' above. As the guard amplitude may have to be attenuated to such a low level that the ADC resolution is not sufficient, the microcontroller 12 can optionally use the demodulated complex guard value from the measurement of X above. In this case, in order to maintain phase consistency between the two measurements, the ADC sampling must be synchronized to the PWM outputs 13, 14, 15 for the two measurements. In order to achieve an optimal tradeoff between measurement accuracy and immunity against injected EMI disturbances on the power supplies and against external alternating magnetic field disturbances, the measurement frequency is set in a range between 10 kHz and 100 kHz. The open-loop gain of the operational amplifiers 5, 5' increases with decreasing frequency, thereby allowing a better measurement accuracy at lower frequencies. On the other hand, the influence of the disturbances above are more relevant at lower frequencies. In order to further improve the robustness against external disturbances such as EMI, several measurement frequencies can be employed. If the measurement result of at least one measurement frequency is disturbed, it can be eliminated by for example calculating the median (for more than two frequencies) or (arithmetic) mean of the measurement results for all frequencies and using the result of the operation for further processing. Another option is to evaluate the presence detection for all frequencies and apply a majority decision on the presence detection results when at least three different frequencies are employed.

When the number of frequencies is sufficiently large, and the different frequencies are applied one after the other, the resulting waveform can also be considered as frequency sweep or chirp. Another option of disturbance detection is that of switching off the guard signal and performing an 'empty' impedance measurement, and evaluating its result. The disadvantage of employing several frequencies sequentially is that the measurement takes longer. This can be an issue if for example, as described below, the capacitive measurement is performed alternatively to the heating function of a heater member used as a sensor electrode. The time available for heating is reduced by the total measurement time, which can be an issue for example for heating up a cold steering wheel when a 100% heating duty is required. For example, for a measurement repetition rate of 30 Hz, and a measurement time of 3.333 ms for one measurement signal frequency, the measurements consumes 30% of the available heating time, and therefore heating power, when three frequencies are used. A solution for this problem is to measure with several frequencies at the same time. This is achieved by generating periodic waveforms, preferably but not necessarily sine waves or approximated sine waves, with different frequencies and superposing the different waveforms for the generation of the guard node voltage. The resulting waveforms at the outputs of the transimpedance amplifiers 33, 33' and therefore at the ADC inputs 9, 9' are then also indicative of the measurement results for all of the different frequencies. The measurement results for the each of the frequencies are extracted and separated by applying one dedicated software demodulator as described above for each of the frequencies. Alternatively, a complex DFT (Discrete Fourier transform) or complex FFT (Fast Fourier Transformation) can also be employed, and the results taken at the wanted frequencies from the DFT or FFT output. The software demodulation can also be done after the ADC results have been recorded, thereby freeing up the heater member for heating. Together with measuring several sensing channels simultaneously as described above, a measurement system tuned for optimal speed can thereby be achieved.

Figure 2:
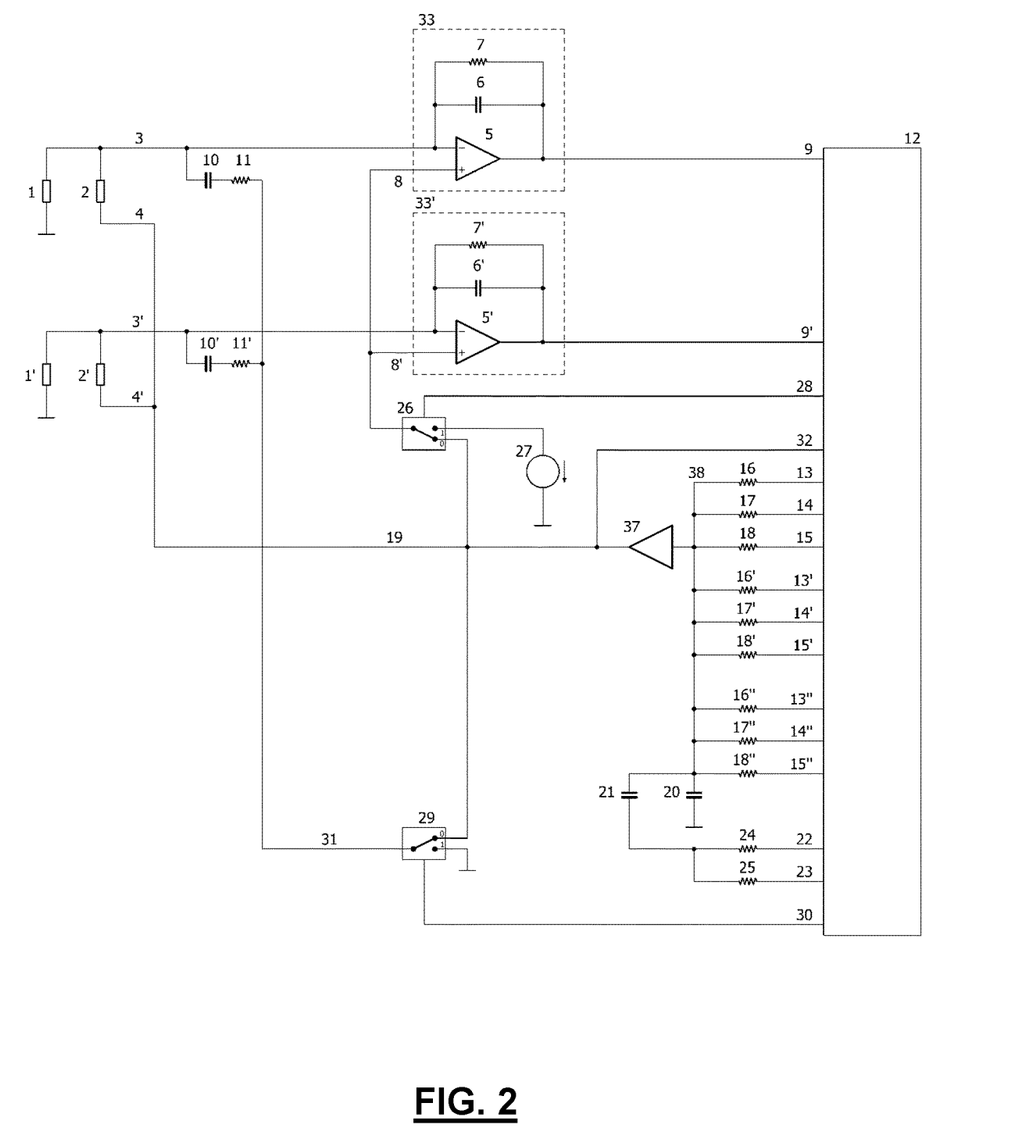

FIG. 2 shows another possible embodiment of the impedance measurement circuit, which generates a superposition of measurement signals of several frequencies on the guard voltage node. In addition to a first pulse generator unit comprising the PWM outputs 13, 14, 15 and weighting resistors 16, 17, 18, a second and third pulse generator unit comprising PWM outputs 13', 14', 15', 13", 14", 15" and resistors 16', 17', 18', 16", 17", 18", respectively, are added. Each of the three pulse generator units operates at a different frequency. Their outputs are summed at the summing node 38. An optional amplifier 37 amplifies the resulting waveform. The circuit in FIG. 3 can also be employed to generate a superposition of several frequencies at the guard voltage node. Several software sine wave or periodic waveform generators, similarly to the methods described already above, can be implemented in parallel, and their output can be summed before writing the sum to the DAC. Another option is to define the frequencies in such a way that the superposition of the different waveforms is a periodic waveform with finite period and store this waveform in the digital data memory unit of the microcontroller.

Figure 4:
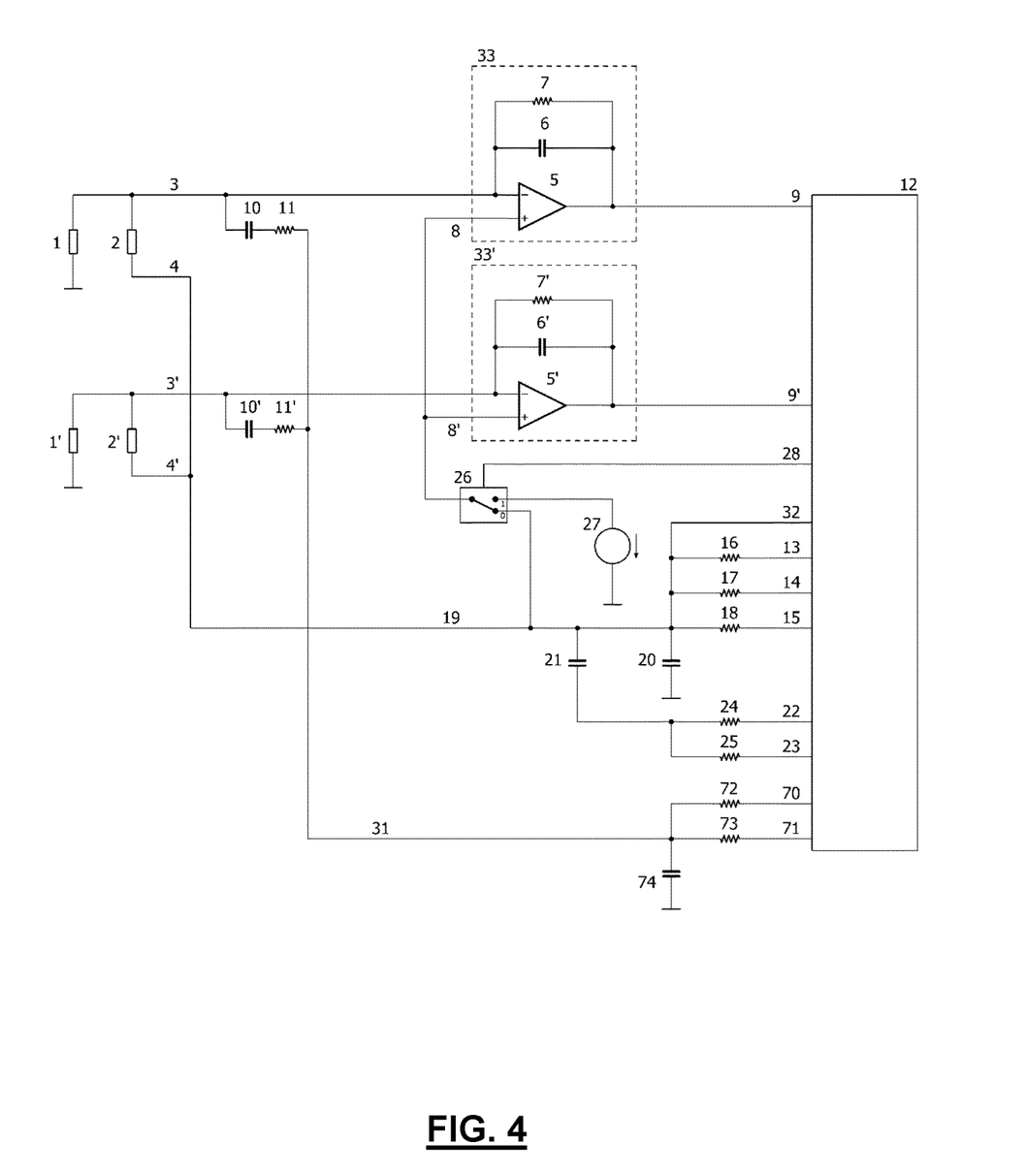

FIG. 4 shows another possible embodiment of the impedance measurement circuit, which does not consume time for measuring the reference impedances 10, 10', 11, 11' for diagnostics or reference purposes. PWM outputs 70, 71 generate together with resistors 72, 73 and capacitor 74 a periodic waveform on node 31. The waveform is preferably an approximated sinewave, but if the accuracy of a sine wave is not needed, for example if the reference impedances 10, 10', 11, 11' are only used for diagnostics purposes, then other waveforms are also possible. In this case, one PWM output can also be sufficient, which saves cost. The periodic waveform on node 31 has a different frequency than the frequency components of the waveform on guard node 19. Thereby, the resulting waveforms at the outputs of the transimpedance amplifiers 33, 33' and therefore at the ADC inputs 9, 9' are indicative at the same time for the measurement results for the measurement of unknown impedances 1, 1' respectively, and for the reference impedances 10, 11, 10', 11'. The measurement results for each of the applied frequencies are extracted and separated by applying one dedicated software demodulator as described above for each of the frequencies on guard node 19, and also for the frequency on common reference impedance node 31. Thereby, the measurement results for the unknown impedances 1, 1' and reference impedances 10, 11, 10', 11' can be extracted in parallel. As above, alternatively, a complex DFT or complex FFT can also be employed, and the results taken at the wanted frequencies from the DFT or FFT output. Additionally, for EMI robustness, the diagnostics measurement can also be performed by the superposition of several waveforms with frequencies which are different among themselves, and which are different to the frequencies for the measurements of the unknown impedances 1, 1'. The same principles which apply to the simultaneous measurement of the unknown impedances 1, 1' with several frequencies also apply to the simultaneous measurement of the diagnostics or reference impedances 10, 11, 10', 11' with several frequencies. Another option is to use a second DAC for the generation of a superposition of waveforms with different frequencies for the reference measurement, similarly to the embodiment of the impedance measurement circuit shown in FIG. 3.

Figure 5:
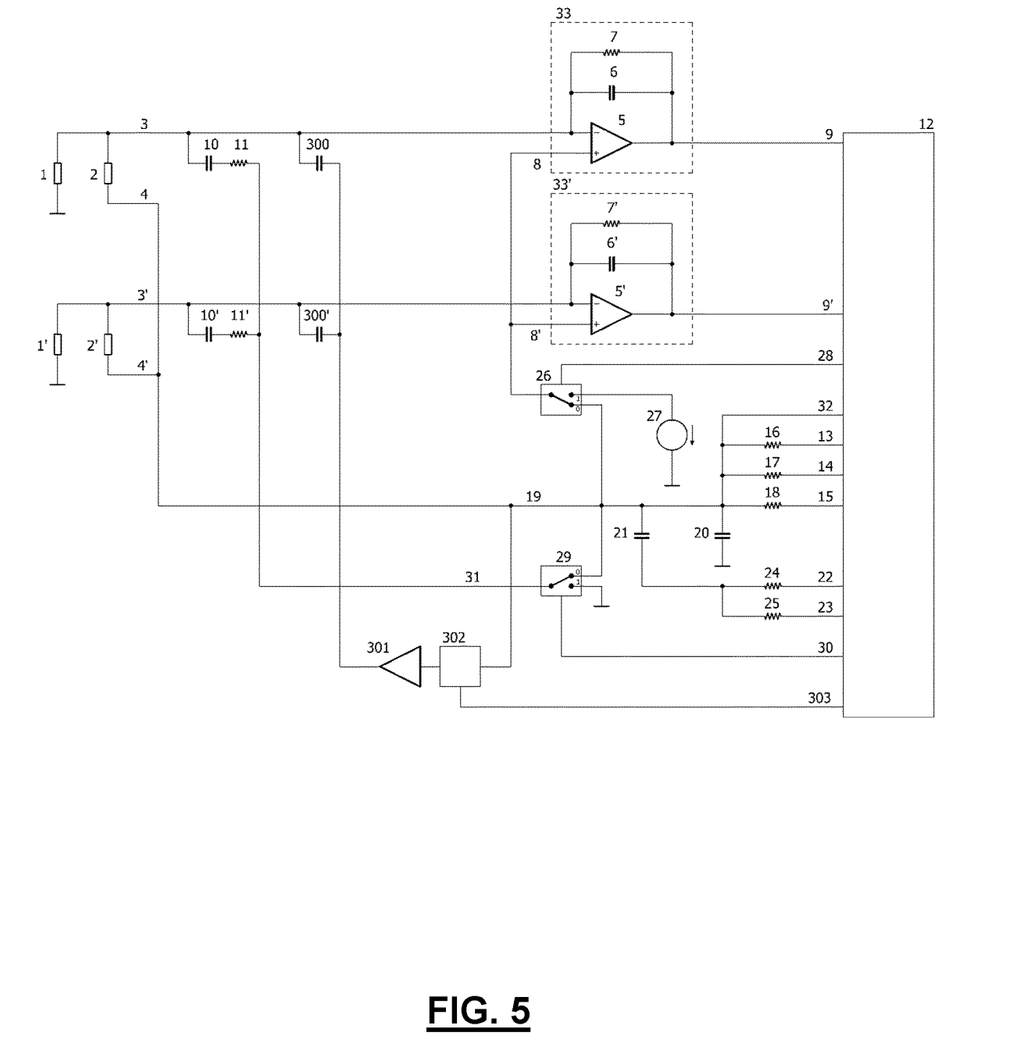

FIG. 5 describes another possible embodiment of the impedance measurement circuit, which allows a variable bipolar offset susceptance to be added in parallel to the unknown impedance 1, 1' to be measured.

For the case that a large offset capacitance is present in parallel to the unknown impedance 1, 1' to be measured, it is preferable to reduce or suppress the effects of this parallel inductance or capacitance in order to reduce the required full measurement range of the signal sensing circuit.

The circuit in FIG. 5 is the same as the circuit in FIG. 1, except that a remotely controllable variable attenuator circuit and two additional reference impedances 300, 300', each with an a priori known impedance, have been added.

A remotely controllable variable attenuator 302 attenuates the guard signal present at node 19. The attenuation is controlled by microcontroller 12 via its control output 303. One example for a variable attenuator is the circuit in FIG. 1 consisting of resistors 24, 25 and capacitor 21 together with the output impedance of the weighting resistor network. The remotely controllable variable attenuator circuit comprises an amplifier 301 that amplifies the output of the variable attenuator 302 by a predetermined constant factor. The voltage at the output of amplifier 301 can thereby for example be set by the microcontroller 12 to a voltage between 0 V and twice the guard voltage.

By setting the right end of capacitors 300, 300' to a voltage which is equal to the guard voltage multiplied by the predetermined constant factor, a selectable portion of the capacitance of capacitors 300, 300' can be added in parallel to the unknown impedance 1, 1' to be measured, or a selectable portion of the capacitance of capacitors 300, 300' can be subtracted from the unknown impedance 1, 1' to be measured.

For example, if the voltage at the output of amplifier 301 is set to be equal to the guard voltage, then the voltage across capacitors 300, 300' is 0 V and no susceptance is added to the unknown impedance 1, 1' to be measured.

For example, if the voltage at the output of amplifier 301 is set to 0 V, then the voltage across capacitors 300, 300' is equal to the guard voltage and capacitors 300, 300' are added to the unknown impedance 1, 1' to be measured.

For example, if the voltage at the output of amplifier 301 is set to twice the guard voltage, then the voltage across capacitors 300, 300' is equal to the negative (inverted) guard voltage and capacitors 300, 300' are subtracted from the unknown impedance 1, 1' to be measured.

This configuration can be useful in order to achieve a fine tuning of the paralleled capacitance.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. An impedance measurement circuit for determining a complex impedance of a capacitive sensor having at least one sense electrode operable in loading mode and at least one guard electrode, comprising:
a pulse generator unit configured to provide a periodic electric measurement signal that comprises a plurality of different fundamental measurement frequencies, and for providing a periodic electric guard signal, a signal sensing circuit configured to sense a sense current flowing through the at least one sense electrode in response to the pulse generator unit measurement signal, a control and evaluation unit configured to determine a complex impedance from the determined sense currents with reference to a complex reference potential, and one or more remotely controllable electric switches for at least one out of selectively connecting one out of at least two provided reference potentials to a reference input port of the current measuring means, and selectively electrically operatively connecting at least one reference impedance of an a priori known impedance either in parallel to the at least one sense electrode or to the provided guard signal, wherein the control and evaluation unit is further configured for controlling the one or more remotely controllable electric switches according to a predefined sequence, and for determining a complex impedance from the determined sense currents with reference to a complex reference potential during predefined stages of the predefined sequence.

2. The impedance measurement circuit as claimed in claim 1, wherein the pulse generator unit is designed as a passive and amplitude-controlled generator unit that comprises a plurality of synchronized pulse width modulation units, wherein the pulse generator unit is configured to weight and to sum output signals of the plurality of synchronized pulse width modulation units having the plurality of different fundamental measurement frequencies, and a passive low-pass filter unit connected in series to the summed output signals.

3. The impedance measurement circuit as claimed in claim 1 wherein the pulse generator unit is designed to have a digital-to-analog converter operatively connected to a digital data memory unit, and wherein the digital data memory unit is configured to provide data to the digital-to-analog converter that represent the periodic electric measurement signal.

4. The impedance measurement circuit as claimed in claim 1, wherein the pulse generator unit is further designed to provide a periodic reference signal to at least one reference impedance of an a priori known impedance, wherein a fundamental frequency of the periodic reference signal is different from any one of the plurality of fundamental measurement frequencies.

5. The impedance measurement circuit as claimed in claim 1, further comprising a remotely controllable variable attenuator circuit that is connected between the provided guard signal and at least another reference impedance having an a priori known impedance, wherein the at least another reference impedance is electrically connected to the at least one sense electrode.

6. The impedance measurement circuit as claimed in claim 1, wherein the control and evaluation unit comprises a microcontroller that includes a processor unit, a digital data memory unit, a microcontroller system clock, and an analog-to-digital converter unit having at least one analog-to-digital converter for at least converting an output signal of the signal sensing circuit.

7. The impedance measurement circuit as claimed in claim 1, wherein the control and evaluation unit is configured to execute an equivalent-time sampling method.

8. The impedance measurement circuit as claimed in claim 1, wherein the control and evaluation unit is configured for applying a software demodulation method to a voltage signal that is representative of a sense current and is digitally converted by the analog-to-digital converter unit, for determining a real part and an imaginary part of the complex impedance of the capacitive sensor.

9. The impedance measurement circuit as claimed in claim 1, wherein the control and evaluation unit is configured for applying a complex discrete Fourier transform DFT or a complex fast Fourier Transform FFT to a voltage signal that is representative of a sense current and is digitally converted by an analog-to-digital converter unit.

10. A capacitive sensing device, comprising
an impedance measurement circuit as claimed in claim 1, and
a capacitive sensor having at least one sense electrode operable in loading mode and at least one guard electrode.

11. A vehicle steering wheel comprising the capacitive sensing device of claim 10.

12. A vehicle seat comprising the capacitive sensing device of claim 10.

* * * * *